Feb. 28, 1939.　　　R. T. WHITNEY　　　2,148,791
BRAKE MECHANISM
Filed March 30, 1938　　　3 Sheets-Sheet 1
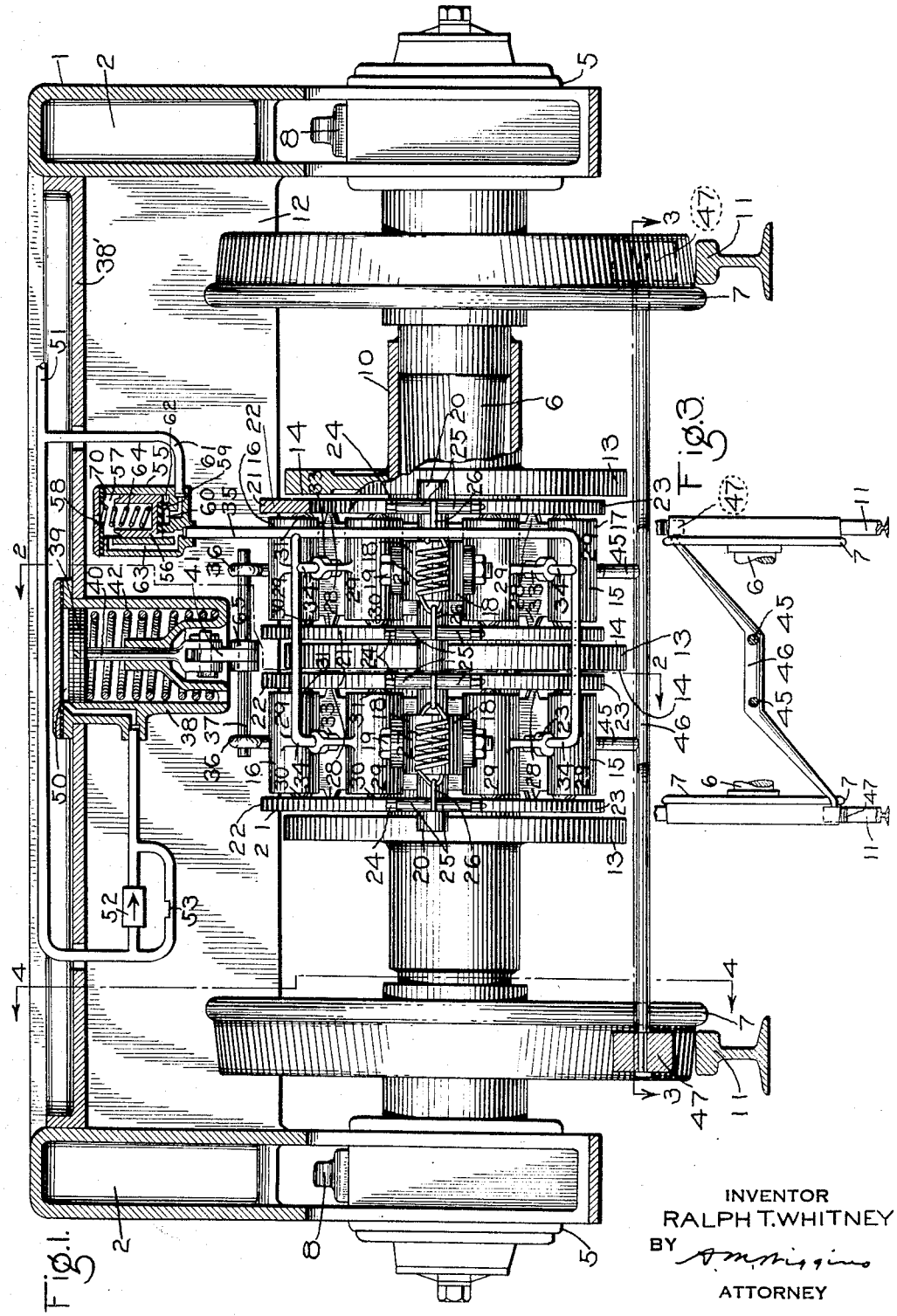
INVENTOR
RALPH T. WHITNEY
BY
ATTORNEY

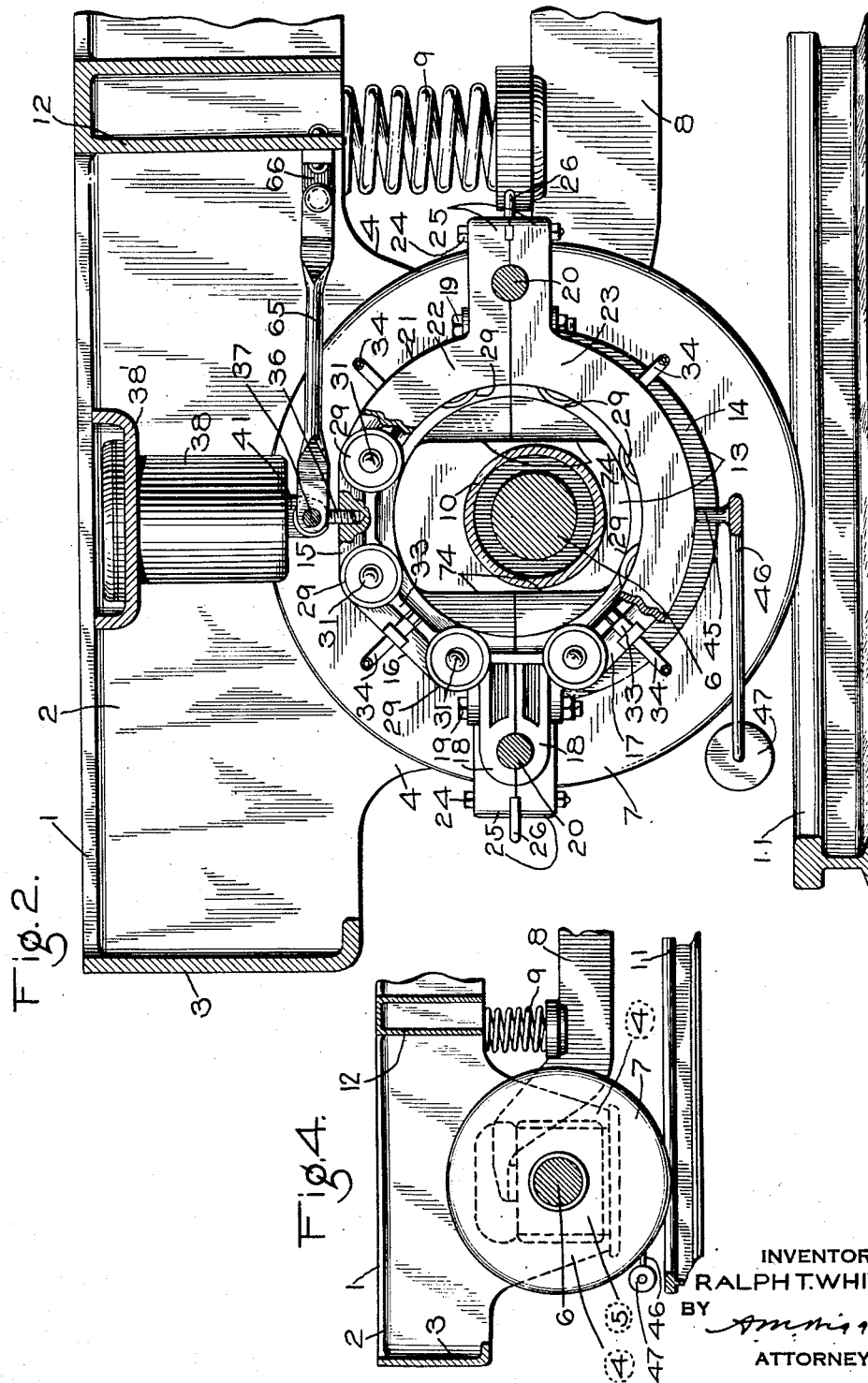

Feb. 28, 1939.   R. T. WHITNEY   2,148,791
BRAKE MECHANISM
Filed March 30, 1938   3 Sheets-Sheet 3
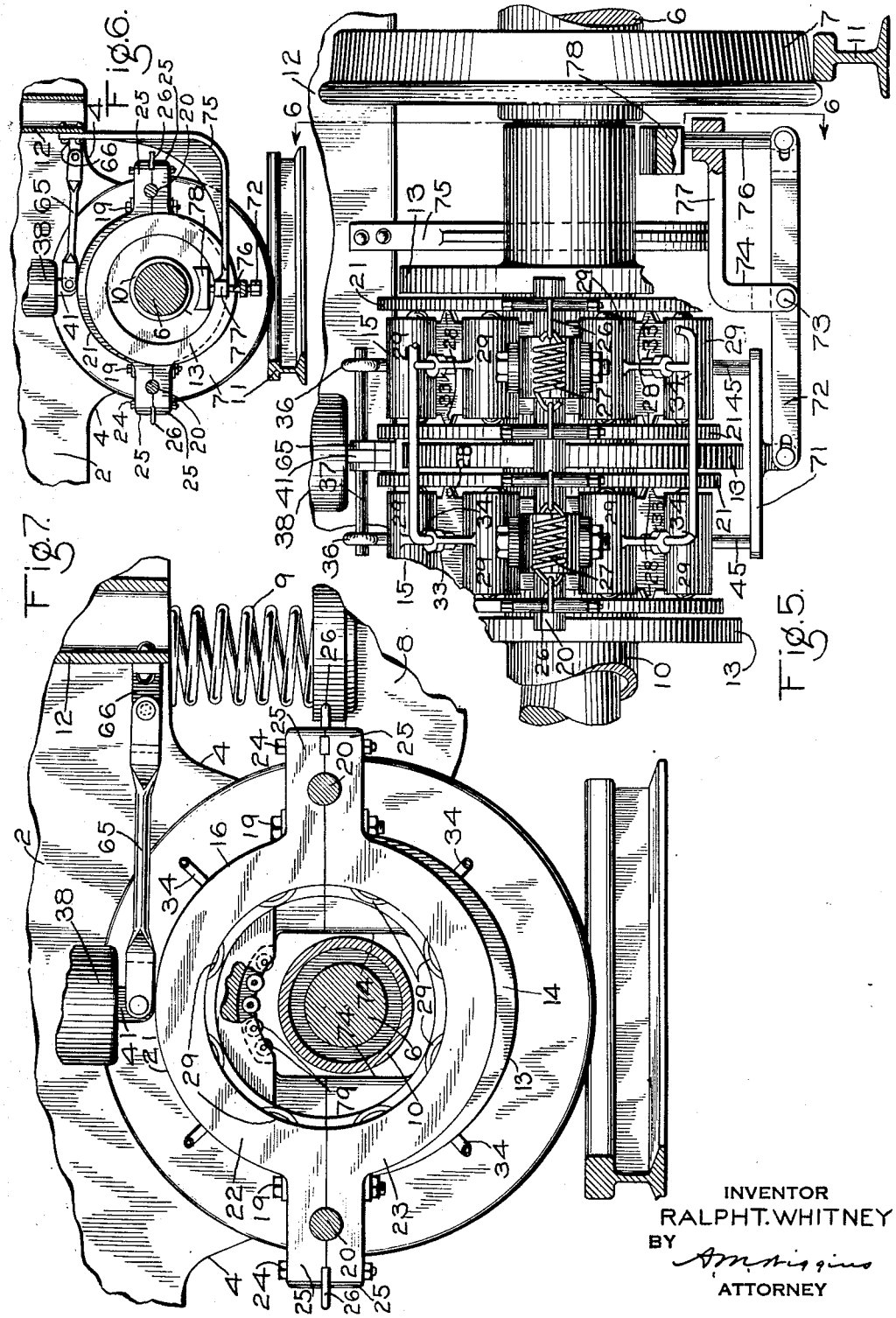
INVENTOR
RALPH T. WHITNEY
BY
ATTORNEY Patented Feb. 28, 1939

2,148,791

UNITED STATES PATENT OFFICE 2,148,791

BRAKE MECHANISM

Ralph T. Whitney, Irwin, Pa., assignor to The Westinghouse Air Brake Company, Wilmerding, Pa., a corporation of Pennsylvania Application March 30, 1938, Serial No. 198,818

23 Claims. (Cl. 188—59)

This invention relates to brake mechanism for vehicles and more particularly to the friction disc type for use in braking the wheels of railway vehicle trucks.

Heretofore disc brake mechanisms have usually been mounted on the axle or carried by the wheels of wheel and axle assemblies of vehicle trucks, thereby subjecting the wheels and axles to the dead or unsprung weight of the mechanisms which, in some instances, may be considered undesirable.

One object of the present invention is therefore to provide an improved disc brake mechanism for the wheels of railway vehicle trucks so constructed and arranged that the major portion of the weight of the mechanism is carried by the truck frame which is spring supported from the wheels.

According to this object, only the rotatable friction disc brake elements are carried by the axle or wheels of a vehicle truck while the non-rotatable friction disc brake elements and the means for controlling movement thereof into and out of frictional contact with the rotatable elements are carried by the truck frame which is spring supported from said axle.

Since the frame of a vehicle truck is resiliently carried by the wheels and is therefore capable of movement vertically relative to the wheels due to different degrees of load carried by the truck, or due to vibration while the truck is in motion, it will be evident that the non-rotatable braking elements of my improved mechanism will move with said frame and therefore assume various positions eccentric to the rotatable braking elements carried by the wheels. When an application of the brakes is effected, however, it is desired that the non-rotatable braking elements be in concentric relation with the rotatable braking elements and another object of the invention is therefore to provide means for positioning the non-rotatable braking elements carried by the truck frame in concentric cooperative relationship with the rotatable braking elements carried by the wheels at the time an application of the brakes is effected. A still further object of the invention is to provide means for arresting the non-rotatable elements in the position in which this relationship is obtained and for holding same in this position while the brakes on the truck are applied.

According to the last two objects the parts of the brake mechanism carried by the truck frame are resiliently supported on one or more springs and a piston is provided which is adapted to be operated, at the time an application of the brakes is initiated, to move said parts into cooperative, concentric relationship with the rotatable elements on the axle, stop means in one form or another being provided to define this concentric relationship and to therefore limit the extent of movement of said piston.

Other objects and advantages will be apparent from the following more detailed description of the invention.

In the accompanying drawings; Fig. 1 is a transverse sectional view of a railway vehicle truck embodying one form of the invention; Figs. 2, 3 and 4 are sectional views taken on the lines 2—2, 3—3 and 4—4 in Fig. 1, Figs. 3 and 4 being drawn to a smaller scale than that of Fig. 1; Fig. 5 is a view similar to a portion of Fig. 1 but embodying a modified form of the invention; Fig. 6 is a sectional view taken on the line 6—6 in Fig. 5; the view being drawn to a smaller scale than that of Fig. 5; and Fig. 7 is a view somewhat similar to a portion of Fig. 2 but embodying still another form of the invention.

As shown in the drawings, the invention is embodied in a railway vehicle truck which for the purpose of illustration may comprise a truck frame 1 having spaced side members 2 connected together by the usual transversely extending end members 3 and transoms 12, only one end member and transom being shown.

The side frames 2 are provided with the usual oppositely disposed pedestals 4 slidably mounted on journal boxes 5 in which the two ends of an axle 6 are journalled. A pair of wheels 7, secured to axle 6 in spaced relation between the journal boxes 5, are mounted to roll on track rails 11 in the usual manner.

The truck shown in the drawings is of the type having an equalizer bar 8 at each of the opposite sides carried by the journal boxes 5 and supporting springs 9 upon which the truck frame 1 is resiliently supported.

A cylindrical torque tube 10 encircling the axle 6 between the wheels 7 is secured at opposite ends to said axle in any desired manner as by welding, and secured to said torque tube so as to rotate therewith are a plurality of rotatable annular, friction disc brake elements 13. In the illustration only three rotatable elements 13 are shown and these elements are equally spaced one from the other and are provided near their peripheries with raised annular braking faces 14.

Between the central and each of the end rotatable elements 13 there is provided an annular brake cylinder device 15 encircling the torque tube 10. These brake cylinder devices are preferably formed in two semi-circular sections 16 and 17 having at opposite sides outwardly directed projections 18 through which bolts 19 are provided which rigidly secure the two sections of each brake cylinder device together.

A rod 20 is provided at each side of the brake cylinder devices 15 and these rods are rigidly clamped between the projections 18 of said devices whereby both of said brake cylinder devices are rigidly secured to said rods in the desired spaced relation midway between the adjacent rotatable elements 13.

Between each side of both brake cylinder devices 15 and the adjacent rotatable element 13 there is disposed an annular non-rotatable friction brake element 21 preferably made up of two oppositely disposed substantially semi-circular sections 22 and 23 rigidly secured together by bolts 24 which pass through openings defined by oppositely disposed outwardly directed projections 25 of the sections which are slidably mounted on the rods 20. The non-rotatable elements 21 are thus adapted to move vertically with the brake cylinder devices 15 and each is provided with a friction face adapted to frictionally engage the adjacent face 14 of the adjacent rotatable element 13 for braking the wheels 7 in a manner to be hereinafter described.

A hook 26 is clamped between the projections 25 of each of the non-rotatable elements 21 and each pair of hooks at the opposite sides of both brake cylinder devices are connected together by a tension spring 27 adapted to urge the non-rotatable elements 21 into engagement with spaced stops 28 provided on the opposite sides of the brake cylinder devices. In other words, the springs 27 are brake release springs for the non-rotatable braking elements 21.

Each of the brake cylinder devices 15 embodies a plurality of brake cylinders 29 of relatively small diameter arranged with their axes parallel to the axis of axle 6. The brake cylinders 29 are arranged around the axle 6 in a circle concentric with the non-rotatable elements 21 and in each there is provided a pair of oppositely working pistons (not shown) which are adapted to be moved in opposite directions outwardly of the brake cylinders by fluid under pressure. One piston in each of brake cylinders 29 is provided with a piston rod 30 adapted upon outward movement of the piston to move the adjacent non-rotatable element 21 into frictional engagement with the adjacent rotatable element 13, while the other piston in each of said brake cylinders is provided with a piston rod 31 for moving the opposite and adjacent non-rotatable element 21 into contact with the adjacent rotatable element 13.

In the illustration four brake cylinders 29 are shown in each of the two sections 16, 17 of the brake cylinder devices 15, and these cylinders are connected together in pairs by fluid conducting passages (not shown) provided through ribs or raised portions 33 in the devices, and each of these passages is connected to a branch pipe 34; the several pipes 34 being in turn connected together and to a pipe 35, as shown in Fig. 1, through which fluid under pressure is adapted to be supplied to and released from said brake cylinders, as will hereinafter be described.

The construction so far described may be generally similar to that disclosed in the pending application of Clyde C. Farmer and Joseph C. McCune filed October 21, 1937, Serial No. 170,240, insofar as the invention is concerned or it may be of any other similar construction embodying rotatable and non-rotatable friction brake elements and fluid pressure operated brake cylinder devices for controlling their operation. A further detailed showing and description thereof is therefore not deemed essential to a comprehensive understanding of the present invention.

It will be noted that since the brake cylinder devices 15 and non-rotatable elements 21 are all secured to and carried by the rods 20, this structure as a unit is capable of movement vertically relative to the rotatable elements 13 which are carried by and secured to the torque tube 10 for rotation therewith.

According to the invention there is provided at the uppermost portion of each brake cylinder device 15 a supporting member which may be in the form of an eyebolt 36, and extending through these eyebolts is a support rod 37.

A cylinder 38 is mounted directly over the rod 37 on any suitable sprung portion of the truck frame 1 such as a member 38' extending between and secured at opposite ends to the side members 2. The cylinder 38 contains a piston 39 and a depending rod 40 secured at its upper end to said piston while pivotally connected to the opposite end of said rod is one end of a link 41. In the other end of the link 41 there is provided a bore through which the rod 37 extends. A spring 42 is provided in the cylinder 38 acting on the lower face of the piston 39, and the pressure of this spring is such as to support, through the medium of the rod 40, link 41 and rod 37, the weight of the two brake cylinder devices 15 and non-rotatable elements 21. With this construction it will be evident that as the truck frame 1 moves vertically relative to the axle 6, the spring 42 will act to move the several brake cylinder devices 15 and non-rotatable elements 21 with the truck frame and therefore relative to the rotatable elements 13, due to which the non-rotatable elements 21 will assume various positions eccentric to the rotatable elements 13, the degree of eccentricity depending upon the vertical position of the truck 1 with respect to axle 6.

Secured to and depending from the lowermost portion of each of the brake cylinder devices 15 is a rod 45 and both of these rods are connected to a member 46. The member 46 extends transversely of the truck and is provided on each of its opposite ends with a roller 47 disposed for engagement with the rail 11. It will be noted that the roller 47 at one end of member 46 is disposed ahead of the wheel 7 at that side of the truck, while the opposite roller 47 is disposed to the rear of the wheel at the opposite side of the truck, this construction being provided to avoid twisting of the element 46 during operation which will be hereinafter described.

In the drawings it will be noted that both of the rollers 47 are shown lifted away from the rails 11; the distance between said rollers and rails being equal to the degree of eccentricity of the non-rotatable brake elements 21 with respect to the rotatable elements 13, and it will therefore be evident that if the brake cylinder devices 15 and nonrotatable elements 21 are moved in a downwardly direction a distance equal to that between the rollers 47 and rails 11, said nonrotatable elements will obtain a position concentric to the rotatable elements 13. The degree of eccentricity of the brake cylinder devices 15 and non-rotatable elements 21 will of course vary according to the vertical position of the truck frame with respect to axle 6 and since the rollers 47 move with said brake cylinder devices, the distance between said rollers and rails 11 will likewise vary, but regardless of this eccentricity, the rollers 11 will engage rails 11 upon downward movement of the brake cylinder devices and non-rotatable elements when said brake cylinder devices and non-rotatable elements move into concentric relationship with the rotatable elements 13, and due to this engagement said rollers will then act to support said brake cylinder devices and non-rotatable devices in this position.

A chamber 50 is provided at the upper face of piston 39 and is connected to a pipe 51 to which fluid under pressure is adapted to be supplied in order to effect an application of the brakes and from which fluid under pressure is adapted to be released in order to effect a release of the brakes.

When fluid under pressure is supplied to the pipe 51 it is adapted to flow to chamber 50 through a check valve 52 and choke 53 so as to provide a prompt build up of pressure in said chamber. When fluid under pressure is released from pipe 51, the release of fluid under pressure from chamber 50 to said pipe is adapted to occur only through choke 53, due to check valve 52, and therefore be at a relatively slow rate.

When in effecting an application of the brakes the pressure of fluid supplied through pipe 51 to chamber 50 and acting on piston 39 is increased sufficiently to overcome the opposing pressure of spring 42, said piston is caused to move downwardly and permit, due to their weight, downward movement of the brake cylinder devices 15 and non-rotatable elements 22. This downward movement is stopped however when the rollers 47 engage the rails 11 at which time the non-rotatable elements 21 are in concentric, cooperative braking relationship with the rotatable elements 13. It will be evident that regardless of the vertical position of the truck frame 1 with respect to the axle 6 the rollers 47 will always act to stop the downward movement of the brake cylinder devices and non-rotatable elements when this concentric relationship with the rotatable elements 13 is obtained.

When in effecting a release of fluid under pressure from pipe 51 the pressure of fluid in chamber 50 becomes reduced sufficiently, spring 42 is adapted to act to raise the brake cylinder devices 15 and non-rotatable elements 21 to their normal position as shown in the drawings.

It will therefore be noted that except when the brakes are applied, the brake cylinder devices 15 and non-rotatable elements 21 will be held in their elevated, eccentric position by spring 42. It will also be noted that when the brake cylinder devices 15 and non-rotatable elements 21 are in their lower position their weight is not carried by the axle 6 or wheels 7 but is supported on the rollers 47 which engage the rails 11.

A delay valve device 55 is provided for controlling communication between the fluid pressure supply pipe 51 and the brake cylinder pipe 35 hereinbefore described. This delay valve device comprises a casing in which there is slidably mounted a valve piston 56 having at one side a chamber 57 which is open to the atmosphere through a passage 58. A seat rib 59 is provided in the casing at the opposite side of the valve piston 66 for engagement therewith. A chamber 60 formed within the seat rib 59 is connected to a pipe 61 leading to the fluid pressure supply pipe 51, while a chamber 62 outside of the seat rib 59 is connected to the brake cylinder pipe 35, and also, by way of a passage 63 to the chamber 57, when the valve piston 56 is in the position shown in the drawings. A spring 64 is provided in chamber 57 and acts on the valve piston 56 with sufficient force to prevent movement thereof from the position shown in the drawings until after sufficient pressure is obtained in chamber 50 for moving the brake cylinder devices 15 and non-rotatable elements 21 to their lower, concentric position, as hereinbefore described.

A torque rod 65 is provided for holding the brake cylinder devices 15 and non-rotatable elements 21 against turning with the rotatable elements 13 when an application of the brakes is effected. One end of this rod is pivotally connected to any suitable fixed part of the vehicle truck, such as the transom 12 through the medium of a bracket 66 secured to said transom, while the other end of said rod is bifurcated and pivotally connected to the bar 37 at the opposite sides of the link 41.

Each of the brake cylinder devices 15 is provided interiorly with a pair of vertically disposed parallel guides 74 one at either side of the torque tube 10. Each of the guides 74 is formed in halves in the two parts 16 and 17 of the brake cylinder devices, and the two guides in each brake cylinder device are spaced apart a distance slightly exceeding the diameter of the torque tube, those guides being provided to maintain the brake cylinder devices 15 and non-rotatable elements 21 in operative relation horizontally with the rotatable elements 13.

In operation, assume that the vehicle truck is moving along the rails 11 and that it is desired to brake said truck. In order to effect an application of the brakes on the truck, fluid under pressure is supplied to pipe 51 in any desired manner and from thence flows through pipe 61 to chamber 60 below the valve piston 56, which at this time is seated in the position shown in the drawings. Fluid under pressure supplied to pipe 51 also flows through check valve 52 and choke 53 (in parallel) to chamber 50 above the piston 39 and therein acts on said piston to move said piston downwardly for thereby effecting movement of the brake cylinder devices 15 and non-rotatable elements 21 from the position shown in the drawings to the position in which said elements are in concentric, cooperative relationship with the rotatable elements 13 as defined by engagement of rollers 47 with rails 11, as hereinbefore described.

The pressure of spring 64 in the hold back valve device 55 is sufficient to maintain the valve piston 56 in engagement with the seat rib 59 until after the brake cylinder devices 15 and non-rotatable elements 21 have been moved to their braking positions just described. A slight increase in the pressure of fluid in pipe 51 and in chamber 60 in the hold-back device then overcomes the opposing pressure of spring 64 and moves the valve piston 56 out of engagement with seat rib 59 and into sealing engagement with a gasket 70 thereby closing communication between passage 63 and the atmospheric port 58.

When the valve piston 56 is thus moved out of engagement with the seat rib 59, communication is established between pipes 61 and 35 whereupon fluid under pressure from pipe 51 is permitted to flow to the several branch pipes 34 and from thence to the connected brake cylinders 29. The fluid pressure thus supplied to the brake cylinders 29 acts on the oppositely operating pistons (not shown) therein to force the piston rods 30 and 31 outwardly and thereby move the adjacent non-rotatable elements 21 into frictional engagement with the adjacent rotatable elements 13 thereby effecting braking of the rotatable elements 13, and through the torque tube 10 the wheels 7 are braked.

The degree with which the wheels 7 are thus braked depends upon the force with which the non-rotatable elements 21 are pressed into frictional engagement with the rotatable elements 13 and may be varied as desired by varying the pressure of fluid supplied to pipe 51 and to the brake cylinders 29, as will be evident.

In order to effect a release of the brakes after an application, fluid under pressure is vented from the pipe 51 in any desired manner, and as a result the fluid under pressure in the several brake cylinders 29 is released by way of the branch pipes 34, pipe 35 and pipe 61, and at the same time fluid under pressure is released from the piston chamber 50 at a restricted rate through the choke 53 and from thence through pipe 51.

When the pressure of fluid from brake cylinders 29 acting on the lower face of the valve piston 56 is thus reduced sufficiently, spring 64 moves the valve piston 56 out of engagement with gasket 70 and to the lower position in engagement with the seat rib 59. In this position communication is closed between the brake cylinder pipe 35 and pipe 61, after which the fluid pressure remaining in the brake cylinders 29 is released by way of pipe 35, passage 63, chamber 57 at the upper face of the valve piston 56 and from thence to the atmosphere through the atmospheric passage 58.

The choke 53 is provided to delay the release of fluid under pressure from piston chamber 50 sufficiently for springs 27 to draw the non-rotatable elements 21 out of engagement with the rotatable elements 13 and into engagement with the stops 28 before the spring 42 is able to start the piston 39 moving upwardly to thereby lift the brake cylinder devices 15 and non-rotatable elements 21 from their braking position to their normal eccentric position, shown in the drawings.

From the above description it will be noted that in effecting an application of the brakes the hold-back valve device 55 acts to delay the supply of fluid under pressure to the brake cylinders 29 until after the brake cylinder devices 15 and the non-rotatable elements 21 are moved downwardly to their concentric braking position, which movement is promptly effected by the relatively fast flow of fluid under pressure through the check valve 52 and choke 53 to the piston chamber 50. The check valve 52 acts to render the choke 53 effective to retard the release of fluid under pressure from chamber 50 in effecting a release of the brakes however, in order that the pressure of fluid in the brake cylinders 29 may be sufficiently reduced to permit the springs 27 to draw the non-rotatable elements 21 out of engagement with the rotatable elements 13 before the spring 42 sarts to move the brake cylinder devices and non-rotatable elements back toward their normal position, shown in the drawings. Thus the movement of the brake cylinder devices and non-rotatable elements to their elevated and working positions is adapted to be effected without dragging contact with the rotatable elements 13.

Now referring to the embodiment of the invention shown in Figs. 5 and 6 of the drawings. In this embodiment the rods 45 depending from the brake cylinder devices 15 are connected to the ends of a cross-head 71 which at its center is connected to one end of a lever 72. The lever 72 is fulcrumed intermediate its ends on a pin 73 secured in an arm 74 which projects from a bracket 75 secured to and depending from the transom 12. The other end of lever 72 is pivotally connected to one end of a rod 76 which slidably extends through a suitable bore in an arm 77 projecting from the bracket 75, and mounted on the end of rod 76 is a shoe 78 disposed beneath the torque tube 10. The surface of the shoe 78 adjacent the tube 10 is formed with the same radius as the tube.

In this embodiment the distance between the tube 10 and the adjacent surface of the shoe 78 corresponds to that between the rollers 47 and rails 11 in the embodiment of the invention shown in Fig. 1 of the drawings and therefore varies according to the vertical position assumed by the vehicle truck 1 with respect to the axle 6.

In the operation of this embodiment, when an application of the brakes is effected the brake cylinder devices 15 are moved downwardly in the same manner as hereinbefore described, and during such movement the shoe 78 is moved toward tube 10 and is adapted to engage said tube at the time the non-rotatable elements 21 obtain their braking position concentric to the rotatable elements 13. The shoe 78 thus defines the braking position of the friction elements 21 with respect to the elements 13 and acts to prevent movement of the elements 21 past this position in a manner similar to the action of the rollers 47, shown in Figs. 1 to 4, when said rollers engage the rails 11. When a release of the brakes is effected and the spring 42 acts to raise the brake cylinder devices 15 and non-rotatable elements 21 to their elevated position as hereinbefore described it will be evident that through the lever 72 the shoe 78 is drawn out of engagement with the torque tube 10 in which condition it is carried at all times except when the brakes are applied.

In the embodiment of the invention shown in Fig. 7, an arcuate bearing preferably provided with anti-friction rollers 79 is provided inside the upper portion 16 of each of the brake cylinder devices 15, these bearings being so arranged that when in engagement with the tube 10 the non-rotatable elements 21 will be in concentric relationship with the rotatable elements 13. When the brakes are released and the several brake cylinder devices 15 and non-rotatable elements 21 are in their elevated positions due to the action of spring 42, the rollers 79 will be disengaged from tube 10, as shown in the drawings, while in effecting an application of the brakes said rollers will be moved into engagement with said tube for defining the braking position of the brake cylinder devices and non-rotatable elements with respect to the rotatable elements 13, as will be evident.

While several embodiments of the invention have been described in detail, it is not the intention to limit the scope to these embodiments or otherwise than by the terms of the appended claims.

Having now described my invention, what I claim as new and desire to secure by Letters Patent, is:

1. A brake mechanism for a vehicle truck having wheels and a frame resiliently carried by said wheels and capable of movement vertically relative to said wheels, said mechanism comprising an annular rotatable friction braking element, an annular non-rotatable friction braking element, means securing said rotatable element to rotate with one of said wheels, a brake cylinder device for effecting frictional braking engagement between said elements for braking said wheel, means carried by said frame for normally supporting said brake cylinder device and non-rotatable element for movement with said frame, and means independent of said elements for moving said brake cylinder device and non-rotatable element relative to said frame into cooperative braking relationship with said rotatable element.

2. A brake mechanism for a vehicle truck having wheels and a frame resiliently carried by said wheels and capable of movement vertically relative to said wheels, said mechanism comprising an annular rotatable friction braking element, an annular non-rotatable friction braking element, means securing said rotatable element to rotate with one of said wheels, an annular brake cylinder device comprising a plurality of brake cylinders arranged in a circle operative to effect movement of said non-rotatable element into braking engagement with said rotatable element, means securing said brake cylinder device and non-rotatable element together in cooperative relation for movement as a unit, means carried by said frame for normally supporting said unit for movement with said frame, and means independent of said elements for moving said unit relative to said frame into cooperative braking relationship with said rotatable element.

3. A brake mechanism for a vehicle truck having wheels and a frame resiliently carried by said wheels and capable of movement vertically relative to said wheels, said mechanism comprising an annular rotatable friction braking element, an annular non-rotatable friction braking element, means securing said rotatable element to rotate with one of said wheels, a brake cylinder device for effecting frictional braking engagement between said elements for braking said wheels, resilient means carried by said frame for supporting said brake cylinder device and non-rotatable element for movement with said frame, and means independent of said elements operative by fluid under pressure for moving said brake cylinder device and non-rotatable element relative to said frame into cooperative braking relationship with said rotatable element.

4. A brake mechanism for a vehicle truck having wheels and a frame resiliently carried by said wheels and capable of movement vertically relative to said wheels, said mechanism comprising an annnular rotatable friction braking element, an annular non-rotatable friction braking element, means securing said rotatable element to rotate with one of said wheels, means for effecting frictional braking engagement between said elements for braking said wheel, a spring carried by said frame, a piston subject on one face to the pressure of said spring and on the opposite face to variations in fluid pressure in a chamber and movable in one direction upon an increase in fluid pressure in said chamber and movable in the opposite direction by said spring upon a reduction in fluid pressure in said chamber, and means connecting said non-rotatable element to said piston for supporting said non-rotatable element from said piston and operative upon movement of said piston in one direction to effect movement of said non-rotatable element relative to said frame into cooperative braking relationship with said rotatable element.

5. A brake mechanism for a vehicle truck having wheels and a frame resiliently carried by said wheels and capable of movement vertically relative to said wheels, said mechanism comprising an annular rotatable friction braking element, an annular non-rotatable friction braking element, means securing said rotatable element to rotate with one of said wheels, means for effecting frictional braking engagement between said elements for braking said wheel, a piston operatively connected to said non-rotatable element, a spring carried by said frame and acting on one face of said piston for supporting said non-rotatable element from said frame, said piston being operative by fluid under pressure supplied to the opposite face to move said piston against said spring for effecting movement of said non-rotatable element relative to and into cooperative relationship with said rotatable element.

6. A brake mechanism for a vehicle truck having wheels and a frame resiliently carried by said wheels and capable of movement vertically relative to said wheels, said mechanism comprising a plurality of interleaved rotatable and non-rotatable annular friction braking elements and annular brake cylinder devices, said brake cylinder devices being operative to control frictional braking engagement between said elements, means securing said rotatable elements to rotate with a pair of said wheels, means securing said non-rotatable elements and brake cylinder devices together for movement as a unit in a vertical direction, a piston operatively connected to said unit, and a spring carried by said frame and acting on one face of said piston for normally supporting said unit for movement with said frame, said piston having at the opposite face a chamber adapted to be supplied with fluid under pressure for moving said piston against said spring for thereby effecting movement of said unit relative to and into cooperative braking relationship with said rotatable element.

7. A brake mechanism for a vehicle truck having wheels and a frame resiliently carried by said wheels and capable of movement vertically relative to said wheels, said mechanism comprising an annular, rotatable friction braking element secured to rotate with one of said wheels, an annular, non-rotatable friction braking element adapted to frictionally engage said rotatable element for braking said wheel, means carried by said frame normally supporting said non-rotatable braking element from said frame, centralizing means connected to said non-rotatable element for effecting movement thereof relative to said frame and rotatable element into cooperative braking relation with said rotatable element, brake control means for controlling the operation of said elements for effecting an application and a release of the brakes on said wheel, and means operative in effecting an application of the brake on said wheel to delay the operation of said brake control means until after the operation of said centralizing means and operative in effecting a release of the brakes to delay the operation of said centralizing means until after the operation of said brake control means.

8. A brake mechanism for a vehicle truck having wheels and a frame resiliently carried by said wheels and capable of movement vertically relative to said wheels, said mechanism comprising an annular, rotatable friction braking element secured to rotate with one of said wheels, an annular, non-rotatable friction braking element, a spring carried by said frame, a centralizing element connected to said non-rotatable element and controlled by said spring and the opposing pressure of fluid in a chamber and operative upon supply of fluid under pressure to said chamber to effect movement of said non-rotatable element relative to said frame and rotatable element into cooperative braking relationship with said rotatable element and operative by said spring upon the relief of fluid under pressure from said chamber to support said non-rotatable element for movement with said frame, brake cylinder means connected to said non-rotatable element adapted to be operated by fluid under pressure to move said non-rotatable element into braking engagement with said rotatable element for effecting braking of said wheel, release means operative upon the release of fluid under pressure from said brake cylinder means to move said non-rotatable element out of frictional engagement with said rotatable element to effect a release of the brakes on said wheel, and valve means for controlling the flow of fluid under pressure to and from said centralizing element and brake cylinder means and operative upon supplying fluid under pressure thereto to delay the supply to said brake cylinder means until after the operation of said centralizing means, and operative upon releasing fluid under pressure therefrom to delay the release of fluid under pressure from said centralizing means for preventing operation of said spring until after the operation of said release means.

9. A brake mechanism for a vehicle truck having wheels and a frame resiliently carried by and capable of movement in a vertical direction relative to said wheels, said mechanism comprising an annular rotatable friction braking element, an annular non-rotatable friction braking element, means securing said rotatable friction element to rotate with one of said wheels, a brake cylinder device for effecting frictional engagement between said elements for braking said wheels, means securing said non-rotatable element and brake cylinder device together for movement as a unit, means carried by said frame and connected to said unit for at one time supporting said unit for movement with said frame and for at another time moving said unit relative to said frame and rotatable element, and mechanism for stopping movement of said unit by said means in a position in which said non-rotatable element is in concentric cooperative relation with said rotatable element.

10. A brake mechanism for a vehicle truck having wheels and a frame resiliently carried by and capable of movement in a vertical direction relative to said wheels, said mechanism comprising an annular rotatable friction braking element, an annular non-rotatable friction braking element, means securing said rotatable friction element to rotate with one of said wheels, a brake cylinder device for effecting frictional engagement between said elements for braking said wheel, means securing said non-rotatable element and brake cylinder device together for movement as a unit, a member having a position fixed in a vertical direction with respect to said wheel, stop means associated with said unit adapted to engage said member in a position of said unit in which said non-rotatable element is in concentric relationship with said non-rotatable element, resilient means carried by said frame for normally supporting said unit for movement with said frame relative to said member, and fluid pressure operative means connected to said unit operative to move said unit relative to said frame to the position in which said stop means engage said member.

11. A brake mechanism for a vehicle having wheels adapted to roll on track rails and a frame resiliently carried by and capable of movement in a vertical direction relative to said wheels, said mechanism comprising an annular rotatable friction braking element, an annular non-rotatable friction braking element, means securing said rotatable element to rotate with one of said wheels, means for effecting frictional engagement between said element for braking said wheel, means carried by said frame and connected to said non-rotatable element for normally supporting said non-rotatable element from said frame for movement therewith, means for effecting movement of said non-rotatable element relative to said frame and rotatable element in a downwardly direction, and means associated with and operative upon said downward movement of said non-rotatable element to engage said track rails in a position of said non-rotatable element substantially concentric with said rotatable element.

12. A brake mechanism for a vehicle having wheels adapted to roll on track rails and a frame resiliently carried by and capable of movement in a vertical direction relative to said wheels, said mechanism comprising an annular rotatable friction braking element, an annular non-rotatable friction braking element, means securing said rotatable element to rotate with one of said wheels, means for effecting frictional engagement between said elements for braking said wheel, means carried by said frame and connected to said non-rotatable element for normally supporting said non-rotatable element from said frame for movement therewith, means for effecting movement of said non-rotatable element relative to said frame and rotatable element in a downwardly direction, and substantially rigid means connected to said non-rotatable element and operative upon downward movement thereof to engage said track rails when said non-rotatable element is in substantially concentric relation with said rotatable element for preventing further downward movement of said non-rotatable element, said rigid means being disengaged from said rails when said non-rotatable element is supported for movement with said frame.

13. A brake mechanism for a vehicle having wheels adapted to roll on track rails and a frame resiliently carried by and capable of movement in a vertical direction relative to said wheels, said mechanism comprising an annular rotatable friction braking element, an annular non-rotatable friction braking element, means securing said rotatable element to rotate with one of said wheels, means for effecting frictional engagement between said elements for braking said wheel, means carried by said frame and connected to said non-rotatable element for normally supporting said non-rotatable element from said frame for movement therewith, means for effecting movement of said non-rotatable element relative to said frame and rotatable element in a downwardly direction, a substantially rigid bar disposed above said track rails and connected to said non-rotatable element for movement therewith, a roller on each end of said bar adapted to engage said track rails in a position of said non-rotatable element substantially concentric with said rotatable element for supporting said non-rotatable element in said position, said rollers being disengaged from said track rails when said non-rotatable element is supported for movement with said frame.

14. A brake mechanism for a vehicle having wheels adapted to roll on track rails and a frame resiliently carried by and capable of movement in a vertical direction relative to said wheels, said mechanism comprising an annular rotatable friction braking element, an annular non-rotatable friction braking element, means securing said rotatable element to rotate with one of said wheels, means for effecting frictional engagement between said elements for braking said wheel, means carried by said frame and connected to said non-rotatable element for normally supporting said non-rotatable element from said frame for movement therewith, means for effecting movement of said non-rotatable element relative to said frame and rotatable element in a downwardly direction, and substantially rigid means associated with said non-rotatable element and cooperative with said track rails upon downward movement of said non-rotatable element to stop said movement when said non-rotatable element is in susbtantial concentric relation with said rotatable element.

15. A brake mechanism for a vehicle having wheels adapted to roll on track rails and a frame resiliently carried by and capable of movement in a vertical direction relative to said wheels, said mechanism comprising an annular rotatable friction braking element, an annular non-rotatable friction braking element, means securing said rotatable element to rotate with one of said wheels, means for effecting frictional engagement between said elements for braking said wheel, means carried by said frame for normally supporting said non-rotatable element from said frame for movement therewith, means connected to said non-rotatable element operative to effect movement thereof in a downwardly direction relative to said frame and rotatable element, a circular element disposed in concentric relation with said rotatable element, a lever connected to said frame and non-rotatable element, and an element carried by said lever and operative upon downward movement of said non-rotatable element to engage said circular element when said non-rotatable element moves into substantial concentric relation with said rotatable element for preventing further downward movement of said non-rotatable element relative to said rotatable element.

16. A brake mechanism for a vehicle having wheels adapted to roll on track rails and a frame resiliently carried by and capable of movement in a vertical direction relative to said wheels, said mechanism comprising an annular rotatable friction braking element, an annular non-rotatable friction braking element, means securing said rotatable element to rotate with one of said wheels, means for effecting frictional engagement between said elements for braking said wheel, a member carrying said non-rotatable element, means carried by said frame and connected to said member normally supporting said member and non-rotatable element from said frame for movement therewith, means for effecting movement of said member and non-rotatable element in a downwardly direction relative to said frame and rotatable element, and a circular element disposed in concentric relation to said rotatable element and in the path of downward movement of said member and adapted to be engaged by said member when said non-rotatable element is in substantial concentric relation with said rotatable element for preventing further downward movement of said non-rotatable element relative to said rotatable element.

17. A brake mechanism for a vehicle having wheels and a frame resiliently carried by and capable of movement in a vertical direction relative to said wheels, said mechanism comprising an annular rotatable friction braking element, an annular non-rotatable friction braking element, means securing said rotatable element to rotate with one of said wheels, an annular member carrying said non-rotatable element, means carried by said frame and connected to said member for normally supporting said annular member and non-rotatable element from said frame for movement therewith, means operative to move said annular member and non-rotatable element relative to said frame and rotatable element in a downwardly direction, and a circular element disposed within said annular member in concentric relation with said rotatable element, said annular member being provided interiorly with a bearing surface adapted to engage said circular element upon said downward movement of said member when said non-rotatable element is in substantial concentric relation with said rotatable element for preventing further downward movement of said non-rotatable element relative to said rotatable element.

18. A brake mechanism for a pair of oppositely disposed wheels of a vehicle truck having a circular member disposed in concentric relation with and secured at opposite ends to said wheels for rotation therewith, and said truck having a frame carried by and capable of movement in a vertical direction relative to said wheels, said mechanism comprising an annular rotatable friction braking element, and an annular non-rotatable friction braking element encircling said member, said rotatable element being secured to said member for rotation therewith, an annular member encircling said circular member and carrying said non-rotatable element and capable of movement in a vertical direction relative to said rotatable element, means carried by said frame for normally supporting said annular member and non-rotatable element from said frame for movement therewith, means for effecting movement of said annular member and non-rotatable element relative to said frame and rotatable element in a downwardly direction, and means associated with said annular member operative upon said downward movement thereof to engage said circular element for stopping such movement when said non-rotatable element is in substantial concentric relation with said rotatable element.

19. A brake mechanism for a pair of oppositely disposed wheels of a vehicle truck having a circular member disposed in concentric relation with and secured at opposite ends to said wheels for rotation therewith, and said truck having a frame carried by and capable of movement in a vertical direction relative to said wheels, said mechanism comprising an annular rotatable friction braking element and an annular non-rotatable friction braking element encircling said member, said rotatable element being secured to said member for rotation therewith, an annular member encircling said circular member and carrying said non-rotatable element and capable of movement in a vertical direction relative to said rotatable element, a piston secured to said annular member, a spring carried by said frame and acting on one face of said piston for normally supporting said annular member and non-rotatable element from said frame for movement therewith, said piston having at the opposite face a chamber to which fluid pressure is adapted to be supplied for moving said piston against said spring to effect movement of said annular member and non-rotatable element relative to said frame and rotatable element in a downwardly direction, and means associated with said annular member and cooperative with said circular member to stop said downward movement when said non-rotatable element is in substantial concentric relation with said rotatable element.

20. A brake mechanism for a vehicle having wheels and a truck frame carried by said wheels, said mechanism comprising an annular member secured to one of said wheels in concentric relation and for rotation therewith, an annular rotatable friction braking element and an annular non-rotatable friction braking element encircling said annular member, said rotatable element being secured to said annular member for rotation therewith, a circular element encircling said annular member and carrying said non-rotatable element, means for supporting said circular element and thereby said non-rotatable element in braking relation with said rotatable element in a vertical direction, a pair of spaced, parallel, substantially vertically extending guides in said circular element one disposed at each side of and in substantial engagement with said annular member for holding said non-rotatable element in braking relation with said rotatable element in a substantially horizontal direction, and a torque member connected to said frame and arranged to hold said non-rotatable element against turning with said rotatable element.

21. In a vehicle brake mechanism, a rotatable element, a non-rotatable element normally positioned out of desired cooperative braking relationship with said rotatable element, positioning means for positioning said non-rotatable element in the desired cooperative braking relationship with said rotatable element, brake applying means for causing said rotatable and non-rotatable elements to engage to produce a braking effect, and means automatically operative when initiating a release operation of the brakes to cause said brake applying means to operate to effect disengagement of said rotatable and non-rotatable elements slightly ahead of the operation of said positioning means which returns said non-rotatable element to normal position.

22. In a vehicle brake mechanism, a rotatable element, a non-rotatable element normally positioned out of desired cooperative braking relationship with said rotatable element, positioning means for positioning said non-rotatable element in the desired cooperative braking relationship with said rotatable element, brake applying means for causing said rotatable and non-rotatable elements to engage to produce a braking effect, and means associated with said non-rotatable element for engaging at least one track rail upon which the vehicle rolls for limiting movement of said non-rotatable element by said postioning means.

23. In a vehicle brake mechanism, a rotatable element, a non-rotatable element normally positioned out of desired cooperative braking relationship with said rotatable element, positioning means for positioning said non-rotatable element in the desired cooperative braking relationship with said rotatable element, brake applying means for causing said rotatable and non-rotatable elements to engage to produce a braking effect, and means separate from said positioning means associated with said non-rotatable element for engaging a stop to provide for the holding of said non-rotatable element in said desired cooperative braking relationship by said positioning means.

RALPH T. WHITNEY.